3,213,104
CYCLOHEXANESPIROHYDANTOINS
Colin Henry Cashin, Birkenhead, and William Oldfield, West Ewell, England, assignors to The Distillers Company Limited, Edinburgh, Scotland, a British company
No Drawing. Filed Feb. 4, 1963, Ser. No. 256,156
Claims priority, application Great Britain, Feb. 10, 1962, 5,187/62
5 Claims. (Cl. 260—309.5)

The present invention relates to substituted hydantoins, and in particular to substituted cyclohexanespirohydantoins.

Accordingly, the present invention comprises substituted cyclohexanespirohydantoins of formula:

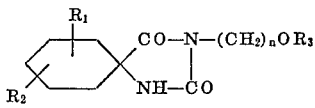

where $n=1$ or 2, $R_1$ and $R_2$ are the same or different, and each is an hydrogen atom or a lower alkyl group, and $R_3$ is an acyl group or hydrogen.

Suitable alkyl groups, which should preferably contain not more than eight carbon atoms, may be branched or straight chain and include for example methyl, ethyl, propyl, isopropyl, butyl and isobutyl. Suitable acyl groups include for example, acetyl, propionyl or butyryl.

Examples of novel compounds according to the present invention include cyclohexanespiro-5'-(3'-hydroxymethyl)hydantoin, cyclohexanespiro-5'-(3'-acetoxymethyl)hydantoin, 2-methylcyclohexanespiro-5'-(3'-hydroxymethyl) hydantoin, and cyclohexanespiro-5'-(3'-2''-hydroxyethyl) hydantoin.

Compounds of the present invention possess valuable pharmacological properties, and many of them, for example cyclohexanespiro-5'-(3'-hydroxymethyl)hydantoin, possess analgesic properties and/or anti inflammatory properties. The compounds may be administered orally, preferably presented in unit dosage form with or without suitable inert pharmaceutical diluents, or by intramuscular injection, in solution or fine suspension.

The compounds of the present invention may be made by any suitable means. A suitable route is to start from cyclohexanespiro-5'-hydantoin or alkylcyclohexanespiro-5'-hydantoins and further substitute the $N^3$ position.

For example, when $R_3$ is hydrogen the appropriate cyclohexanespirohydantoin or alkylcyclohexanespirohydantoin may be reacted with formaldehyde when $n$ is required to be 1, or with 2-haloethanol (preferably 2-chloroethanol) when $n$ is required to be 2.

When $R_3$ is acyl, the $N^3$-hydroxyalkylcyclohexanespirohydantoin prepared as described above may for example be further reacted with the appropriate acylating agent (preferably an acid chloride or anhydride) to introduce the desired acyl group at $R_3$.

Alternatively, when $R_3$ is acyl, the appropriate cyclohexanespirohydantoin or alkyl cyclohexanespirohydatoin may be treated for example with an acyloxy alkyl halide of formula $X(CH_2)_nOR_3$ where X is a halogen atom (preferably chlorine or bromine) and $n$ and $R_3$ are as hereinbefore defined.

The invention will be further understood by reference to the following examples which illustrate processes for the production of novel compounds of the present invention.

EXAMPLE 1

Preparation of cyclohexanespiro-5'-(3'-hydroxymethyl) hydantoin 24.6 g. cyclohexanespiro-5'-hydantoin and 88.0 ml. of a 36% weight/volume formalin solution were boiled for 3 minutes, when complete solution had occurred, and the mixture was cooled. The precipitate formed on cooling was filtered off, washed with a little water and dried in vacuo at 70° C. Yield of cyclohexanespiro-5'-(3'-hydroxymethyl)hydantoin was 18.3 g., M. Pt. 173–175° C. After recrystallisation from ethyl acetate/petroleum ether, the M.Pt. was 173–5° C.

$C_9H_{14}N_2O_3$ requires: C, 54.5%; H, 7.15%; N, 14.15%.
Found: C, 54.0%; H, 6.95%; N, 13.95%.

EXAMPLE 2

Preparation of cyclohexanespiro-5'-(3'-acetoxymethyl)hydantoin 5.0 g. cyclohexanespiro-5'-(3'-hydroxymethyl)hydantoin and 40.0 ml. acetic anhydride were refluxed for 30 minutes. The mixture was cooled and poured into 200 ml. ice water. The precipitate so formed was filtered off and washed with a little water. Yield of cyclohexanespiro-5'-(3'-acetoxymethyl)hydantoin was 4.3 g., M.Pt. 159–160° C. On recrystallisation from ethyl acetate, the M.Pt. was 161–162° C.

$C_{11}H_{16}N_2O_4$ requires: C, 55.0%; H, 6.70%; N, 11.65%.
Found: C, 55.0%; H, 6.40%; N, 11.70%.

EXAMPLE 3

Preparation of 2-methylcyclohexanespiro-5'-(3'-hydroxymethyl)hydantoin 20.0 g. 2-methylcyclohexanespiro-5'-hydantoin and 35.0 ml. of a 36% weight/volume formalin solution were warmed on a boiling water bath until complete solution occurred. The mixture was concentrated to half volume by heating in vacuo, and cooled. A precipitate was formed which was filtered off, slurried with diethyl ether and dried in vacuo. The yield of 2-methylcyclohexanespiro-5'-(3'-hydroxymethyl)hydantoin was 7.5 g., M.Pt.: 150–154° C. On recrystallisation from methylene chloride/carbon tetrachloride, the M.Pt. was 150–152° C.

$C_{10}H_{16}N_2O_3$ requires: C, 56.5%; H, 7.60%; N, 13.20%.
Found: C, 56.0%; H, 7.50%; N, 12.90%.

EXAMPLE 4

Preparation of cyclohexanespiro-5'-(3'-2''-hydroxyethyl)hydantoin 20.24 g. cyclohexanespiro-5'-(3' sodio)hydantoin and 30.0 ml. of 2-chloroethanol were heated on a water bath at 100° C. for 4 hours. The chloroethanol was removed in vacuo and the solid residue was extracted with hot methylene chloride. The methylene chloride solution was concentrated and diluted with carbon tetrachloride. A white solid was obtained in a yield of 7.5 g., M.Pt.: 149–150° C. After recrystallisation for ethyl acetate, the M.Pt. was 156–8° C.

$C_{10}H_{16}N_2O_3$ requires: C, 56.5%; H, 7.60%; N, 13.20%.
Found: C, 56.5%; H, 7.60%; N, 13.05%.

We claim:
1. A substituted cyclohexanespirohydantoin of the formula

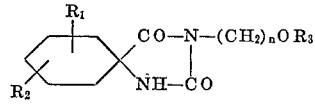

where $n$ is an integer selected from the group consisting of 1 and 2, $R_1$ and $R_2$ are each selected from the group consisting of a hydrogen atom and an alkyl group of not more than eight carbon atoms, and $R_3$ is selected from the group consisting of a hydrogen atom and lower alkanoyl.
2. Cyclohexanespiro-5'-(3'-hydroxymethyl)hydantoin.
3. Cyclohexanespiro-5'-(3'-acetoxymethyl)hydantoin.
4. Cyclohexanespiro-5'-(3'-2''-hydroxyethyl)hydantoin.

5. 2-Methylcyclohexanespiro-5'-(3'-hydroxymethyl)hydantoin.

References Cited by the Examiner

UNITED STATES PATENTS

| | | | |
|---|---|---|---|
| 2,155,863 | 4/39 | Jacobson | 260—309.5 |
| 2,225,384 | 12/40 | Graenacher et al. | 260—309.5 |
| 2,516,145 | 7/50 | Prichard | 260—309.5 |
| 2,516,635 | 7/50 | Livak | 260—309.5 |
| 2,704,287 | 3/55 | Archer | 260—309.5 |
| 2,935,448 | 5/60 | Calder | 167—65 |
| 2,994,640 | 8/61 | Zellner | 167—65 |

OTHER REFERENCES

Ware: Chem. Reviews, vol. 46, page 453 (1950).

WALTER A. MODANCE, *Primary Examiner.*

FRANK CACCIAPAGLIA, JR., *Examiner.*